B. C. SWINEHART.
VEHICLE TIRE.
APPLICATION FILED NOV. 29, 1907.
926,969.
Patented July 6, 1909.
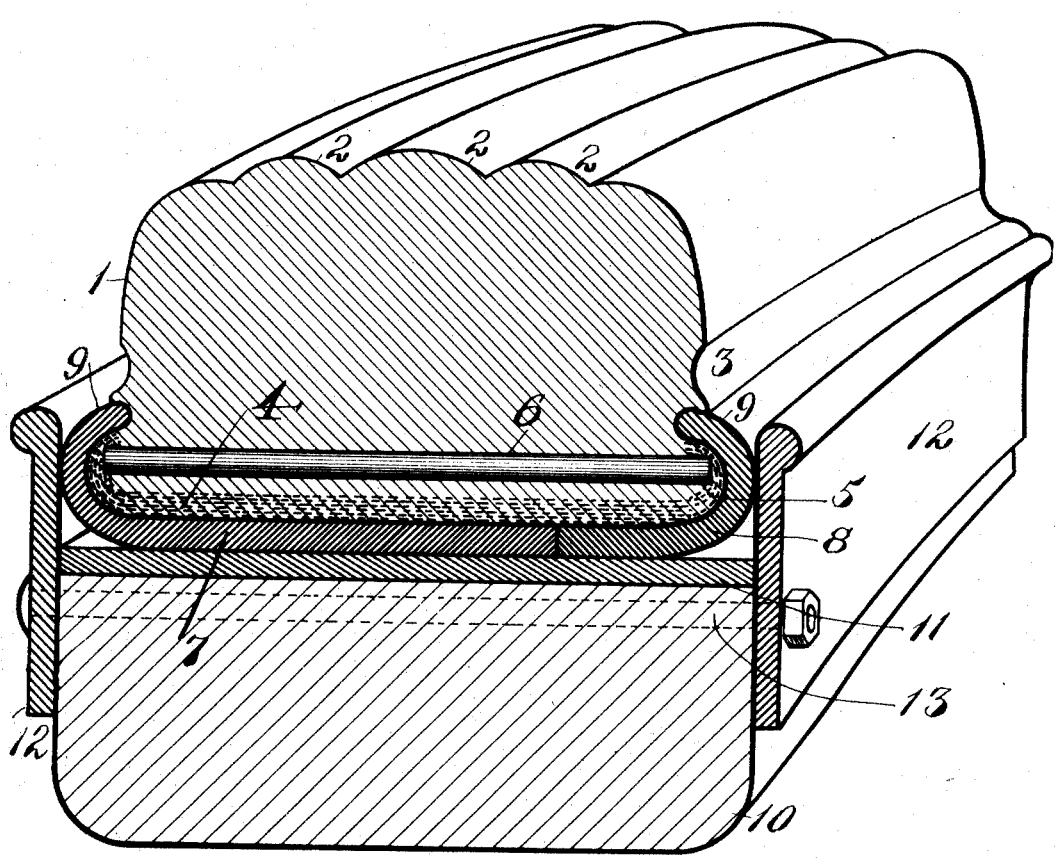
Witnesses:
a. E. Kling
Glenara Fox
INVENTOR—
Benjamin C. Swinehart.
By C. E. Humphrey,
ATTORNEY.

UNITED STATES PATENT OFFICE.

BENJAMIN C. SWINEHART, OF AKRON, OHIO.

VEHICLE-TIRE.

No. 926,969.

Specification of Letters Patent.

Patented July 6, 1909.

Application filed November 29, 1907. Serial No. 404,278.

*To all whom it may concern:*

Be it known that I, BENJAMIN C. SWINE-HART, a citizen of the United States, residing at Akron, in the county of Summit and State of Ohio, have invented new and useful Improvements in Vehicle-Tires, of which the following is a specification.

This invention relates to improvements in elastic tires for vehicle wheels.
The object of the invention is to provide a tire of elastic material provided with circumferentially-extending ridges along the base portion, said base portion having a plurality of layers of fabric incorporated therein extending outwardly into said ridges and arranged substantially parallel with the outer surfaces of the base and ridges and vulcanized in the material of the tire.

A further object of the invention is to embed in the base portion of the tire a plurality of separated transversely-extending wires or bars with the medial portions thereof vulcanized in the material of which the tire is composed and with the ends of said wires or bars terminating in said ridges and embedded in said layers of fabric whereby the ends of said bars are approximately inclosed by the fabric which prevents wearing or tearing of the tire when in use and the cross wires from spreading or moving apart when a load is imposed on the tread of the tire adjacent to said cross wires. The embedding of the ends of the cross wires in the layers of fabric in the lateral ridges of the tire securely anchors them against movement, but at the same time permits the rubber intervening between the various cross wires to stretch or yield when under compression due to a load.

The invention further contemplates mounting a tire so constructed in a two-part clencher rim, the members of which are provided with inturned lateral flanges adapted to engage the lateral ridges of the tire for holding the same on a wheel rim and simultaneously said cross wires or bars embedded in said fabric by reason of the snug engagement of the rim with the lateral faces of the tire.

With the foregoing and other objects in view, the invention consists in the novel construction, combination and arrangement of parts constituting the invention to be hereinafter specifically described and illustrated in the accompanying drawing which forms a part hereof wherein is shown the preferred embodiment of the invention, but it is to be understood that changes, variations and modifications can be resorted to which come within the scope of the claim hereunto appended.

The drawing presented is a transverse sectional view of the tire portion of a vehicle wheel, with a tire embodying this invention mounted thereon in operative relation therewith.

Referring to the drawing in detail, the reference numeral 1 denotes an elastic tire which may be constructed in continuous lengths or in the form of an annulus, preferably provided with a plurality of beads 2 on its tread portion and having along the sides thereof grooves or concave portions 3. The base portion of the tire is provided with circumferentially-extending ridges 5 adapted to fit the common type of clencher rim, and incorporated in the lower portion thereof are one or more layers of fabric 4 extending outwardly into said lateral ridges and preferably arranged approximately parallel with the outer surfaces of the base of the tire and said ridges, both to strengthen the same and to provide means in which to embed the ends of separated transversely-extending wires or bars 6. The wires or bars 6 are, as before stated, preferably spaced apart from each other a preferred distance with the medial portions thereof embedded in the material of which the tire is composed and with the ends thereof embedded in the layers of fabric which are extended outwardly into the lateral ridges 5, so that the ends of the wires are inclosed to such an extent as to prevent injury to the material of the tire when in use. The wires 6 are placed in the body of the tire during the making thereof with their ends embedded in the fabric and are so vulcanized that when the tire leaves the mold after vulcanization, the ends of the wires are approximately covered by the fabric extending into the ridges 5.

This tire is adapted to be mounted on a split clencher rim comprising two members 7 and 8 provided with inturned hook-shaped side flanges 9 common in this type of rim. The combined width of the two members 7 and 8 is such that when the tire is positioned on the rim the base portion will be sufficiently compressed to keep the ends of the cross wires or bars 6 embedded in the layers of fabric 4 which are extended outwardly into the ridges 5.

This tire with its rim composed of the members 7 and 8 is designed to be seated upon a vehicle wheel rim comprising preferably a felly 10 having a peripheral rim 11 with lateral flanges 12, 12 adapted to be secured to the felly by means of bolts 13 extending therethrough. The width of the felly 10 and rim 11 is preferably such that when the lateral flanges 12 are drawn snugly against the felly by means of the bolts 13 the flanges 12 will compress the two members 7 and 8 of the rim onto the lateral ridges 5 of the tire, thereby securely holding the tire in position with the ends of the cross wires or bars embedded in the layers of fabric.

From the foregoing it will be seen that the transversely-extending wires or bars 6 extended as they are into the ridges 5 and under the overhanging edges of the rim in connection with which they are adapted to be used are prevented from being forced outwardly therefrom and the base of the tire is thereby secured in position. Further, the ordinary wear incident to the employment of cross wires in the base of the tire is approximately eliminated, by reason of the fact that the ends of these cross wires are embedded in the tough wear-resisting layers of fabric which constitute not only a portion of the base of the tire but also of the lateral ridges 5, the ends of the wires therein being so completely covered as to prevent their cutting or tearing the rubber of which the tire is composed. It will be further seen that by embedding the ends of the cross wires or bars in the layers of fabric in the lateral ridges 5 the former cannot be distorted or moved from their position, by reason of any lateral or twisting strain exerted on the tread of the tire, by reason of the fact that the fabric is approximately unyielding, and as it substantially envelops the ends of the wires, the latter are held thereby from moving in any direction. At the same time the wires, by reason of their rigidity when the tire is mounted in a rim, force the lateral ridges 5 into such snug engagement with the rim on which the tire is mounted that substantially any tendency of the tire to creep in the rim or move circumferentially is approximately eliminated.

What I claim and desire to secure by Letters Patent, is:—

An improved vehicle tire comprising a body of elastic material having a base and a tread, the former provided with circumferentially-extending ridges, a plurality of layers of fabric incorporated in said base and ridges arranged approximately parallel with the outer surfaces thereof and a plurality of separated transversely-extending bars embedded in the base of the tire and at their ends embedded in the fabric in said ridges.

In testimony whereof I have hereunto set my hand in presence of two subscribing witnesses.

BENJAMIN C. SWINEHART.

Witnesses:
C. E. HUMPHREY,
ELMA BLINN.